Nov. 7, 1961     L. K. HEINRICH     3,007,240
APPARATUS FOR INSERTING GASKET MATERIAL
Filed Feb. 11, 1957     4 Sheets-Sheet 3
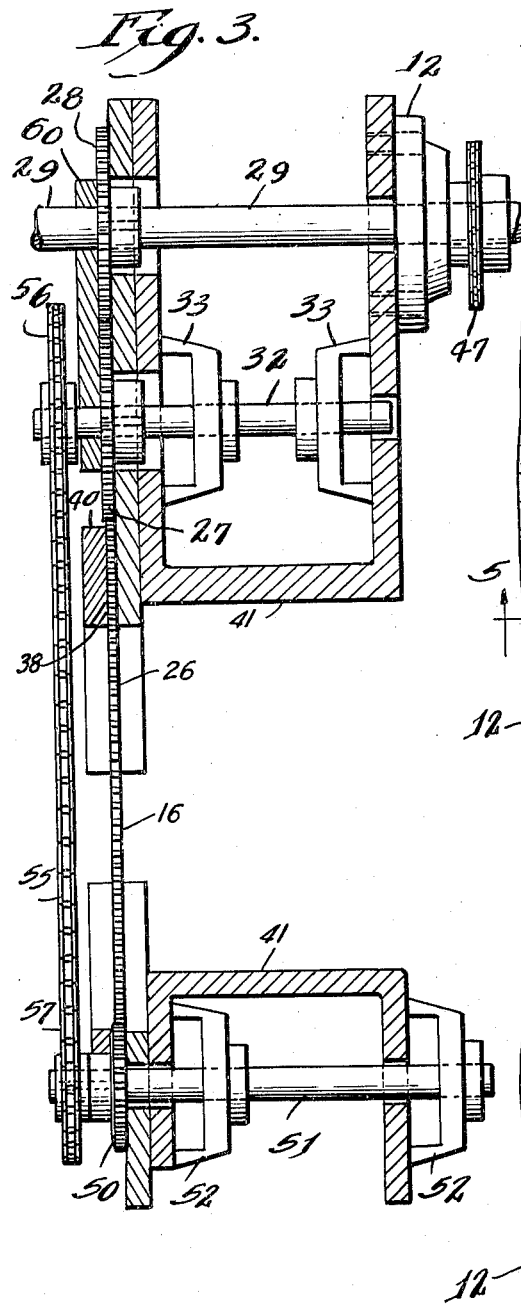
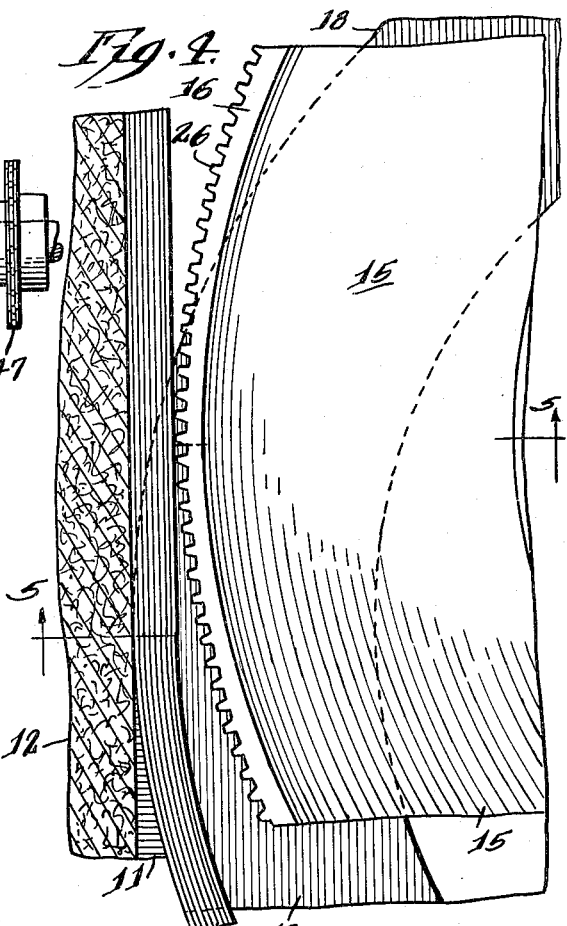
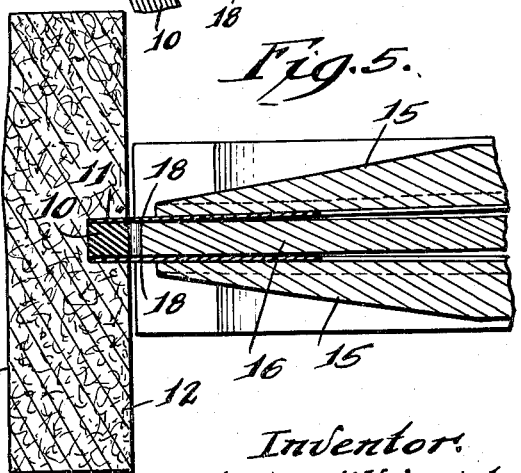
Inventor:
Ludwig K. Heinrich.
By Edw. A. Hampson
Attorney.

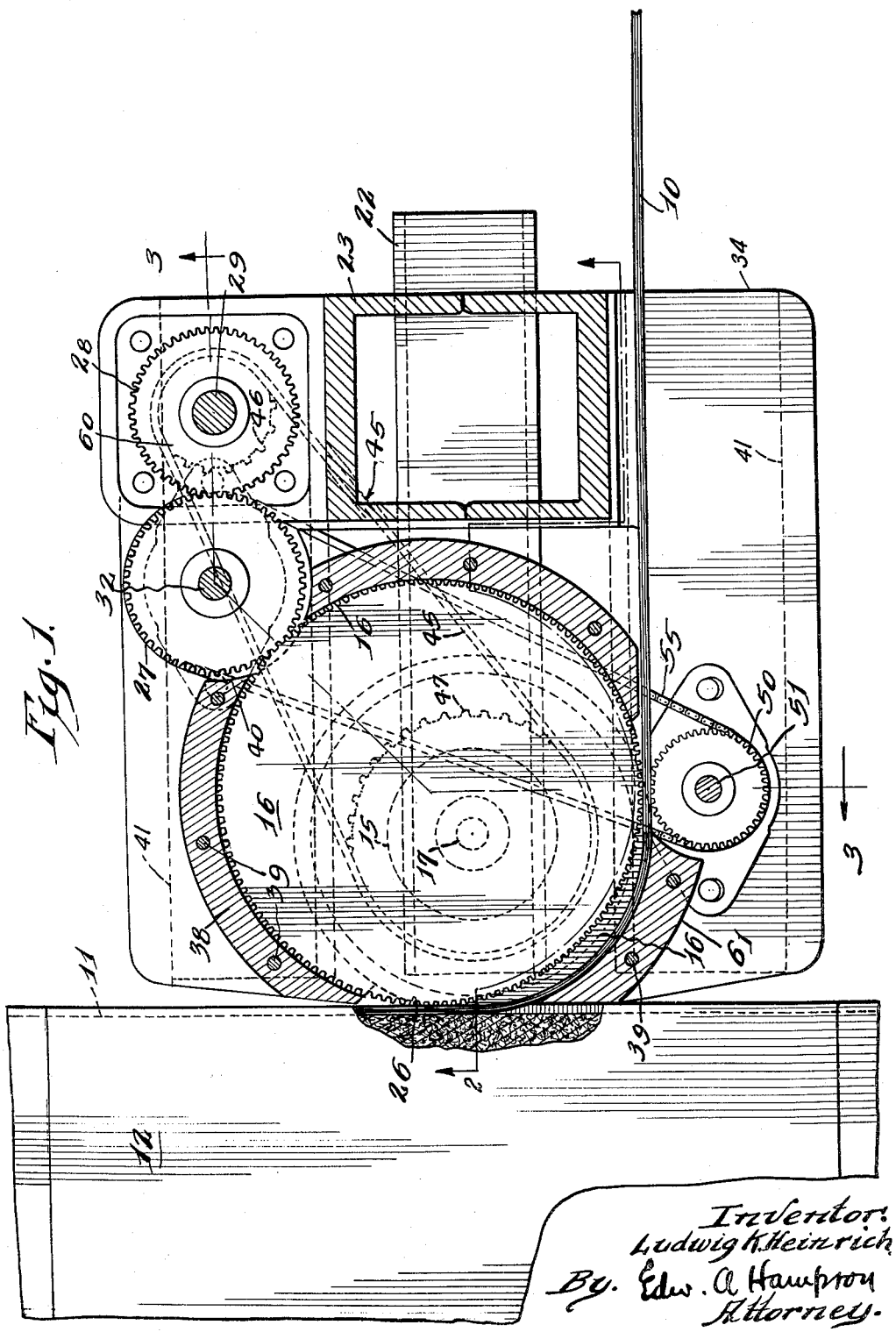

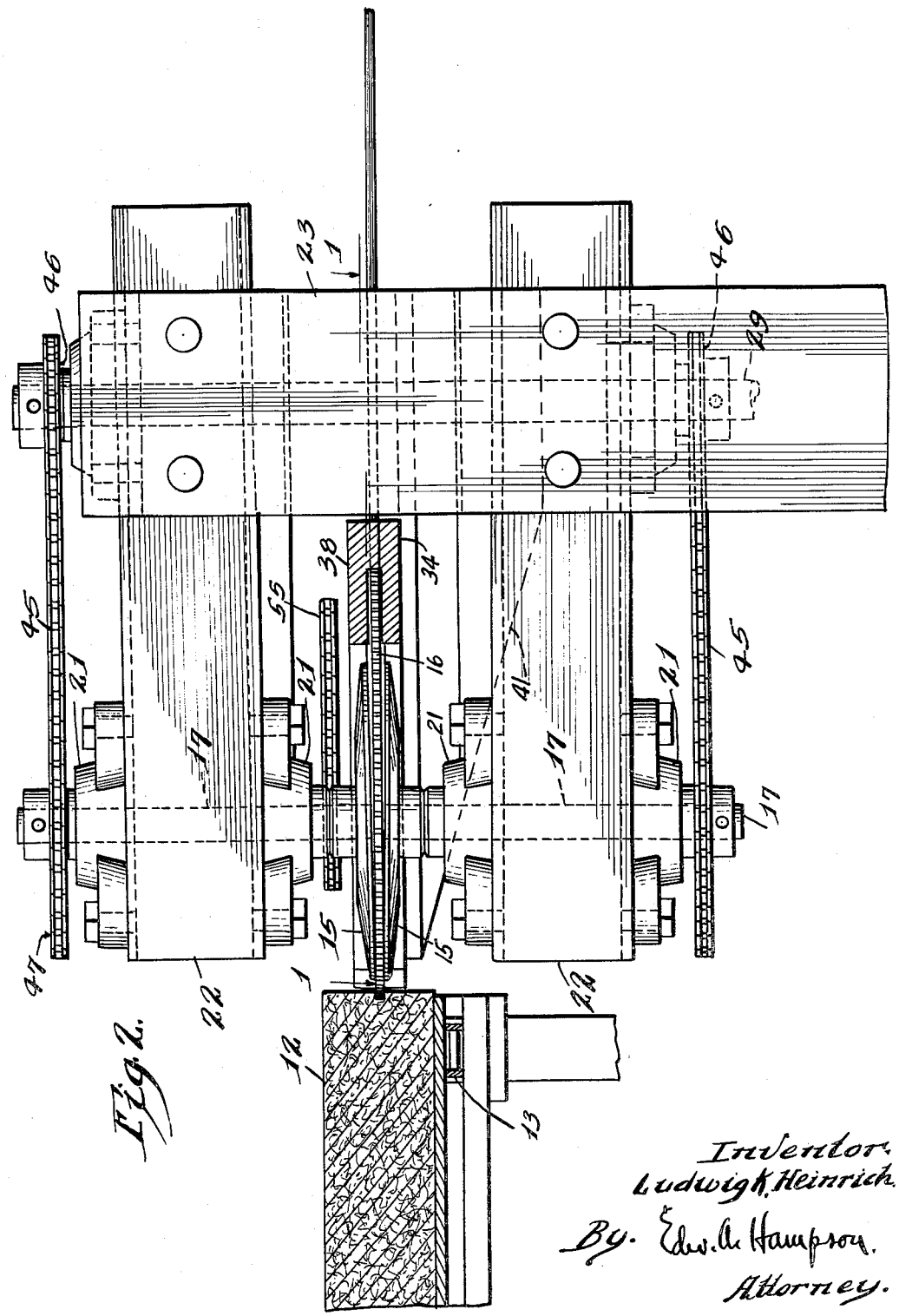

Inventor,
Ludwig K. Heinrich.
By Edw. A. Hampson
Attorney.

United States Patent Office 3,007,240
Patented Nov. 7, 1961

3,007,240
APPARATUS FOR INSERTING GASKET MATERIAL
Ludwig K. Heinrich, Chesterton, Ind., assignor to The Celotex Corporation, Chicago, Ill., a corporation of Delaware
Filed Feb. 11, 1957, Ser. No. 639,411
6 Claims. (Cl. 29—235)

This invention concerns an apparatus which specifically is for inserting strip-form gasket material in a slot provided in the edge of a block of fiber insulation board. It is to be understood, however, that this apparatus may be utilized for inserting substantially any somewhat compressible strip material in a groove or its equivalent.

The principal object of the invention is the provision of an apparatus which will satisfactorily feed and insert strip material in a groove or groove-like recess, which involves not only the insertion of the material in the recess but additionally requires that there be provision for retaining the inserted material in the recess until after withdrawal of the inserting device.

Other objects of the invention are the provision of such an apparatus which is of simple construction, is rugged, and in particular an apparatus which will require but little maintenance or upkeep.

Figure 6:
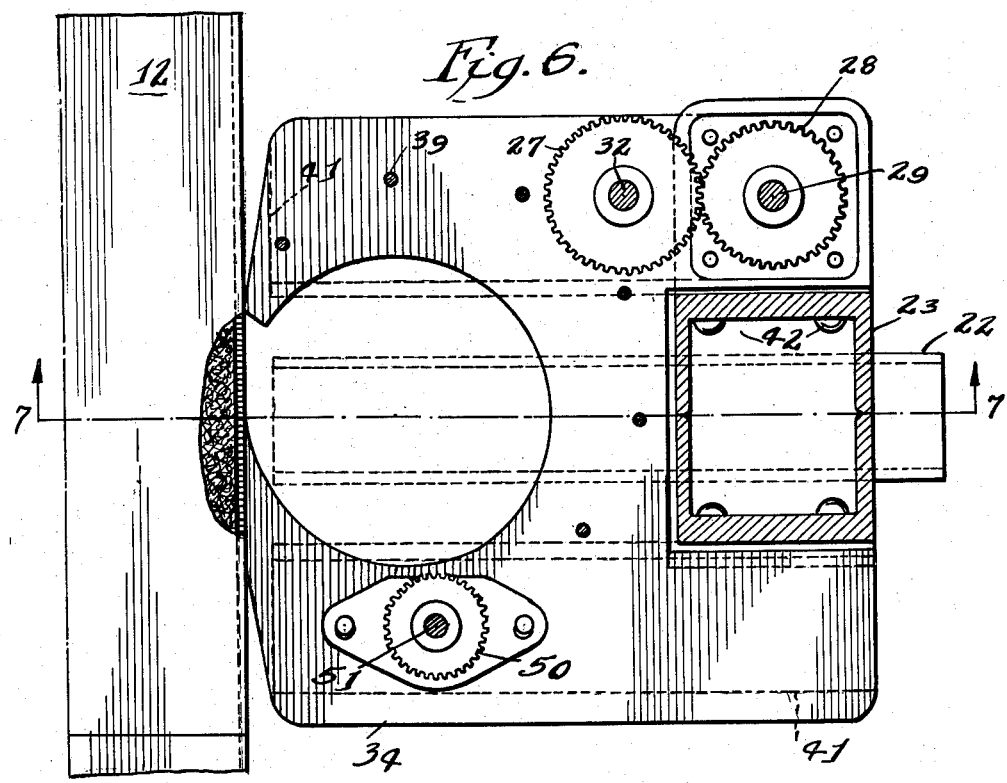
Figure 7:
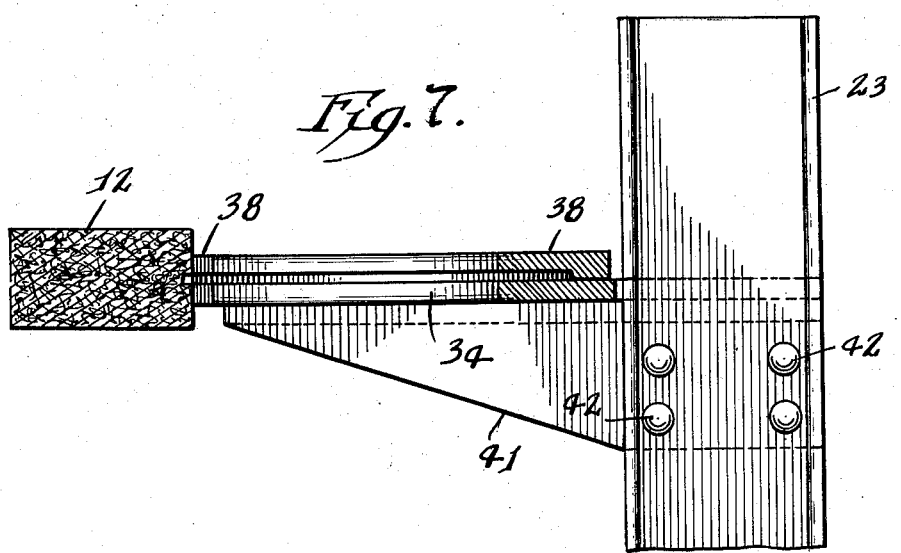

In the accompanying drawings:
FIGURE 1 is a sectional view taken on line 1—1 of FIGURE 2;
FIGURE 2 is a side elevation taken along line 2—2 of FIG. 1;
FIGURE 3 is a detail sectional view taken on line 3—3 of FIGURE 1 with parts shown in elevation and with the hold down discs not shown;
FIG. 4 is an enlarged detail illustrating the insertion of the gasket material;
FIGURE 5 is a similar enlarged detail taken on line 5—5 of FIGURE 4;
FIGURE 6 is a view similar to that of FIGURE 1 with certain operating parts deleted; and FIGURE 7 is a side elevation taken along line 7—7 of FIGURE 6 less certain operating parts.

For a description of the specific apparatus and its operation, the apparatus has been illustrated and will be described as one for inserting a soft rubber gasket material in a groove formed in the edge of a block or panel of fiber insulation board.

Gasket material 10, of soft rubber and which, as will be understood, may be round, square or other suitable shape, is fed into the apparatus as a continuous strip, as from a reel thereof or the like, and is inserted in a slot 11 in the edge of a block or panel 12 which, it will be understood, it moved by suitable conveyor 13.

Inserting discs 15 are provided for inserting or placing strip 10 in slot 11, and what will be termed "hold-down" wheel 16 holds or retains the strip 10 in slot 11 as the inserting edges of discs 15 are withdrawn from their operation of inserting the gasket in the slot. Inserting discs 15 are mounted on shafts 17 which are slightly inclined from a straight line. The inclination of shafts 17 being approximately only one degree, it has not been possible to show such inclination on the drawing in such manner that it may be seen. However, if the illustration of discs 15 will be examined it will be seen that at diametrically opposite points discs 15 substantially contact the faces of hold-down wheel 16, which is positioned between the discs 15 whereas, directly opposite, the edges of discs 15 are distinctly spaced from the faces of hold-down wheel 16. This showing, it is felt, clearly evidences the inclination of shafts 17, as just previously referred to.

Discs 15 comprise relatively heavy or substantially central portions to which are secured at their outer peripheries, thin or knife-edge annular members 18, the purpose of which will be apparent as this description proceeds. These knife-edge members may be secured to the central portions of discs 15 by brazing or the like, but as these members will eventually wear and require replacement, it is desirable that the method of attachment be such that they may be replaced without serious difficulty. Shafts 17, on which discs 15 are mounted, are in turn mounted in suitable bearings 21 which are bolted or otherwise secured to frame members 22 which in turn are suitably secured to a mounting post or supporting frame member 23.

Hold-down wheel 16 is mounted between discs 15 eccentric thereto, as is most clearly evident in FIGURE 1. Hold-down wheel 16 is in part supported on plate 34 and is mounted in an external bearing 38 comprising the major segment of a circle suitably bolted or otherwise secured to plate 34.

Plate 34 is mounted on and supported by angle brackets 41, which are suitably secured to post 23 as by rivets or the like 42.

Without proceeding with the detailed description of the various drives or the like, there will be given at this point a short description of the essential features of operation of the apparatus so far described in inserting a gasket. Assuming that the conveyor on which panel 12 is mounted is progressing panel 12 in operational relationship to the apparatus, that is, in such position that the outer portions of knife-edge annular members 18 will enter in groove 11 of the panel, and that the discs 15 and hold-down wheel 16 are being driven, the action is as follows:

A soft rubber of other somewhat compressible gasket strip 10 suitably feeding between the knife edges 18 of inserting discs 15 will be slightly compressed therebetween and carried by such knife-edge portions into slot 11. Referring particularly to FIGURE 4, it will be seen that just after knife edges 18 have inserted the gasket strip 10 in the slot 11, due to the eccentricity of hold-down wheel 16 with respect to the axis of discs 15, the outer face of hold-down wheel 16 will contact the outer surface of the gasket strip 10 to hold it in slot 11 in its inserted position, whereupon again, due to the relative eccentricity of members 15 and 18, knife-edge inserting portions 18 withdraw from slot 11 leaving gasket 10 positioned therein and held in place by the outer periphery face of hold-down wheel 16. Finally, as the panel progresses a little further, the periphery face of hold-down wheel 16 will recede from the face of the gasket and the procedure for inserting the gasket is completed.

Further details of the apparatus including those of the various drives, etc., are as follows:

Hold-down wheel 16 is provided around its periphery with rather fine gear teeth 26 by means of which it is driven and which also, in conjunction with a cooperating gear, constitutes the feed device for feeding the gasket strip for insertion. Gear 27 is mounted on a stub shaft 32 in turn mounted in suitable bearings 33 secured to or mounted to plate 34 and a supporting member suitably secured thereto. Gear 27 is in turn driven from gear 28 which is mounted on the main drive shaft 29 in turn suitably mounted in bearings in the supporting frame members 22. In connection with these various members just previously described, it is evident as main shaft 29 rotates gear 28 and transfer gear 27, which is in mesh with hold-down wheel 16, that hold-down wheel 16 will be rotated within its peripheral bearing 38.

In this connection, of course, it is understood that as shown in FIGURE 1, peripheral bearing 38 is provided with a cut-out 40 and that gear 27 projects into such cut-out 40 and meshes with the gear teeth 26 of hold-down wheel 16.

Mounted on each of shafts 17 there are provided sprockets wheels 47 which through chains 45 are driven by sprockets 46 mounted on main drive shaft 29.

Feeder wheel 50 which cooperates with hold-down wheel 16 in feeding the gasket strip 10 may be provided with gear teeth similar to the gear teeth 26 of hold-down wheel 16, or the peripheral surface may be milled or the like since the feeder wheel periphery does not mesh with hold-down wheel 16. Feeder wheel 50 is mounted on shaft 51 running in bearings 52 which are mounted to an element of plate 34. Sprocket 57 mounted on shaft 51 is driven by chain 55 in turn driven by sprocket 56 which is mounted on stub shaft 32, the shaft which carries the intermediate hold-down wheel driving gear 27.

In connection with the various drives above described, that is, concerning the gears and sprockets referred to, no specific gear or sprocket data has been given. The speeds of the various driven members being all identical, that is, the peripheral speeds, it is, of course, within the province of a designer to provide gears and sprockets which will drive the inserting discs 15, the hold-down wheel 16 and feeder wheel 50 at like peripheral speeds.

While not at all essential, but due to the fact that the train of gears 28, 27 and 16 preferably have fine or small teeth, and in order especially to maintain proper tooth contact of gears 27 and 28, it is deemed desirable that a plate 60 be provided to insure maintenance of proper meshing of the teeth of gears 27 and 28. This is merely a suitable plate with accurately spaced holes provided therethrough to fit over shafts 29 and 32 and to assist in maintaining the exact spacing thereof.

To lead the gasket strip 10 into and to retain it between the knife-edge members 18, a guide strip member 61 is positioned just beyond feeder wheel 50, in the direction of feed. This guide strip 61 has an inner face of circular contour corresponding to the periphery of annular knife-edge members 18 and it is positioned with this circular form face just out of contact with the outer periphery of knife-edge members 18. The guide strip 61 may be secured to plate 34 by cap screws or the like 39 similar to those securing moon-shape member 38.

On reading the foregoing description of the apparatus the operation of the apparatus should be evident. To insure that the operation of the apparatus will be understood, the following short description of its operation is given.

With the drive shaft of the apparatus suitably driven from a motor or the like, and assuming that the conveyor on which the panels are carried is moving the panels forward at a coordinated rate of advance, the operation is as follows:

Gasket strip 10 is fed forwardly from a suitable reel or the like gripped between the peripheries of hold-down wheel 16 and feeder wheel 50. The gasket strip is directed by guide strip 61 to between the outer edges of the knife-edge portions 18 of inserting discs 15, which at this point are spaced, due to the inclination of the axis of the discs, sufficiently to receive gasket strip 10. As knife-edge portions 18 advance they approach one another again, due to the inclination of their axis, to grip and somewhat compress gasket strip 10 and then carry it into or insert it in slot 11 in the edge of the panel or block 12. After knife-edge members 18 have inserted gasket strip 10 in slot 11 and before they recede from the slot, due to the eccentricity of inserting discs 15 and hold-down wheel 16, the periphery of hold-down wheel 16 contacts the outer face of gasket 10 so that gasket 10 is securely held in slot 11 as knife edges 18 come out of and recede from slot 11. Of course, as the operation proceeds further, hold-down wheel 16 recedes from the surface of the gasket strip, the gasket strip at this point being inserted securely in slot 11.

The inventions hereof having been described in detail, I claim:

1. Apparatus for inserting a gasket strip and comprising in combination means compressing and inserting the gasket strip, means in part enclosed by said compressing and inserting means and mounted in eccentric rotational relationship thereto retaining the gasket in place and means operatively connected to said compressing and inserting means causing withdrawal of and release of the gasket compressing and inserting means from the inserted gasket, while the gasket retaining means retains the gasket in place.

2. Apparatus for inserting a gasket strip and comprising in combination spaced members, means causing the spaced members to grip an interposed gasket strip and while the strip is so gripped to position the gripped portion of the strip in a suitably related groove, a frame member, means positioned between the spaced gripping members and mechanism moving such means to cause a surface of such means to contact a surface of the inserted strip, the strip positioning members and interposed strip contacting means mechanically connected and eccentrically mounted on said frame member one with respect to the other so that the gripping members release and withdraw from the inserted strip while the strip contacting means remains in contact with the strip.

3. The method of inserting a compressible gasket strip of a width greater than the width of a groove for receiving the gasket into a gasket receiving and retaining groove in a structural member and comprising the steps; deforming the strip by compression in one plane to a width less than that of the groove and with the strip so deformed inserting the strip in the groove, contacting the strip in a plane at right angles to the first plane and retaining the strip in the groove, releasing the strip deforming force, while still contacting and retaining said strip in said groove, and subsequently removing said strip retention.

4. Apparatus for inserting strip gasket material in a gasket receiving slot and comprising in combination, spaced disc members having thin edge portions, the discs mounted on separate shafts extending in opposite directions and each similarly and slightly inclined whereby the disc edges at diametrically opposite points are more widely spaced apart at one such than at the other, the discs provided with thin knife-edge like annular peripheral portions, a wheel member of greater diameter positioned between the spaced discs, an external bearing to which the wheel member is mounted, the such external bearing eccentric with respect to the centers of the discs, a rotary gasket feeder means operatively associated with said wheel member positioned to feed the gasket strip to between the edge portions of the discs and driving means driving the discs, the wheel member and the feeder means at like peripheral speeds.

5. Apparatus for inserting strip gasket material in a gasket receiving slot and comprising in combination, spaced rotating means laterally compressing the gasket strip while concurrently feeding said strip and subsequently releasing said strip, and means in part positioned between the spaced rotating means and pressing against a face of the strip while the strip is compressed between the spaced rotating means and continuing to press against the face of the strip thereafter subsequent to release of the strip by the spaced rotating means and while the spaced rotating means withdraws from the strip, and mounting means mounting said strip pressing means for rotation about an axis eccentric to the axis of the spaced rotating means.

6. Apparatus for inserting strip gasket material in a gasket receiving slot and comprising in combination, spaced rotating means for receiving a gasket strip therebetween while laterally compressing the gasket strip and concurrently feeding into a groove the said strip both forwardly and transversely with respect to the direction of the exerted compressive force and then withdrawing therefrom, means in part positioned between said spaced rotating means having an edge face effective as a rising and receding cam face and positioned with respect to the spaced rotating means whereby the apex thereof is positioned, in the direction of feed through the spaced rotating means, just past the position at which the spaced rotating compressing and feeding means withdraws from the gasket strip, and mounting means mounting said means for rotation about an axis eccentric to the axis of the spaced rotating means.

References Cited in the file of this patent

UNITED STATES PATENTS

| | | |
|---|---|---|
| 1,556,234 | Maise | Oct. 6, 1925 |
| 1,879,440 | Olson | Sept. 27, 1932 |
| 2,638,131 | Rohs | May 12, 1953 |
| 2,695,445 | Johnson et al. | Nov. 30, 1954 |
| 2,761,199 | Allen | Sept. 4, 1956 |